(12) United States Patent
Gillet et al.

(10) Patent No.: US 9,163,657 B2
(45) Date of Patent: Oct. 20, 2015

(54) REMOTE MANIPULATOR WITH UNIVERSAL CABLE

(71) Applicant: GILLET GROUP, Nogent (FR)

(72) Inventors: Pascal Gillet, Nogent (FR); Fabrice Petit, Orcevaux (FR)

(73) Assignee: GILLET GROUP, Nogent (FR)

( * ) Notice: Subject to any disclaimer, the term of this patent is extended or adjusted under 35 U.S.C. 154(b) by 205 days.

(21) Appl. No.: 13/908,074

(22) Filed: Jun. 3, 2013

(65) Prior Publication Data

US 2013/0319165 A1   Dec. 5, 2013

Related U.S. Application Data

(60) Provisional application No. 61/700,087, filed on Sep. 12, 2012.

(30) Foreign Application Priority Data

Jun. 1, 2012   (FR) ...................................... 12 55071

(51) Int. Cl.
| | |
|---|---|
| *F16C 1/12* | (2006.01) |
| *B25B 7/12* | (2006.01) |
| *B25B 25/00* | (2006.01) |
| *F16C 1/10* | (2006.01) |

(52) U.S. Cl.
CPC ... *F16C 1/12* (2013.01); *B25B 7/12* (2013.01); *B25B 25/005* (2013.01); *F16C 1/102* (2013.01); *Y10T 74/2042* (2015.01)

(58) Field of Classification Search
CPC .............. F16C 1/12; F16C 1/102; F16C 1/14; F16C 1/145; B25B 7/12; B25B 25/005; Y10T 74/2042
USPC ............................................ 74/501.6; 81/9.3
See application file for complete search history.

(56) References Cited

U.S. PATENT DOCUMENTS

| | | | | |
|---|---|---|---|---|
| 6,189,190 B1* | 2/2001 | Gillet et al. | ...................... | 29/229 |
| 6,276,236 B1* | 8/2001 | Wu | ................................. | 81/9.3 |
| 6,370,985 B1* | 4/2002 | Wu | ................................. | 81/9.3 |
| 6,736,031 B1* | 5/2004 | Kang | ............................... | 81/9.3 |
| 7,104,162 B1* | 9/2006 | Wu | ................................. | 81/9.3 |
| 7,313,984 B1* | 1/2008 | Eggert et al. | ..................... | 81/9.3 |

* cited by examiner

*Primary Examiner* — David B Thomas
(74) *Attorney, Agent, or Firm* — BCF LLP

(57) ABSTRACT

A remote manipulator of a tool has a body provided with a fixed jaw and a slide provided with a mobile jaw able to be displaced linearly, actuators located at a distance and coupled to the tool via a cable integral with a side of the slide and sliding inside a flexible sheath having one end integral with the body. The actuators have two arms each associated respectively to a handle and able to be separated angularly from each other by rotation about an axis by a value such that the distance between their free ends is at least equal to the maximum linear displacement of the slide bearing the mobile jaw, when the two handles are brought close to one another.

11 Claims, 3 Drawing Sheets

REMOTE MANIPULATOR WITH UNIVERSAL CABLE

CROSS-REFERENCE

The present application claims priority to U.S. provisional patent application Ser. No. 61/700,087, filed Sep. 12, 2012, entitled "Remote Manipulator with Universal Cable" and French patent application serial no. 1255071, filed Jun. 1, 2012, the entirety of both of which is incorporated herein by reference.

TECHNICAL FIELD

This invention relates to a remote manipulator with cable comprising a fixed jaw and a mobile jaw able to be displaced linearly in relation to the fixed jaw by means of actuating located at a distance, particularly useful in the assembly and in the disassembly of elastic strip collars widely used in the field of the automobile, for example for fastening hoses onto cooling pipes that are subjected to substantial variations in the outside diameter thereof, due to the strong dilatations.

BACKGROUND

It has been known for a long time that in order to maintain coupling seals between the hose and pipe, it is not possible to use for example rigid collars with screws, giving rise to the interest of elastic clamping collars referred to in what follows as elastic collars. Such collars are conventionally manufactured using a metal strip formed according to a generally circular ring. Said ring is naturally able to be deformed by separation of the two ends thereof which create an elastic restoring torque used as clamping.

It is also known that in order to create this type of collar, the two ends of a spring strip are overlapped. Said two ends are provided with rectangular drive lugs obtained by simple folding of the extreme portions thereof towards the exterior of the collar. As such, using a pair of pliers provided with jaws, the two drive lugs can easily be brought closer together in order to enlarge the diameter of the collar causing when the torque is released the elastic restoring required for the clamping.

Many tools for the assembly and the disassembly of elastic collars are available to users, and most of these tools, manual or automatic, operate on very simple lever systems such as for example X-shaped pliers.

As such, a system for remotely manipulating a tool disclosed in patent application EP 0946337 is already known. Said system for remote manipulating comprises a fixed jaw and a mobile jaw able to be displaced linearly in relation to a fixed jaw thanks to means of actuating located at a distance and coupled to said tools by the intermediary of a cable connected on one side to the mobile jaw and sliding inside an advantageously flexible sheath of which one end comes to abut against the fixed jaw in order to allow the cable to slide. This system for remote manipulating is such that the means for actuating thereof comprise two arms which are articulated on the same axis in such a way that they can be separated angularly by a value such that the distance between the free end thereof is at least equal to the maximum linear displacement of the mobile jaw, when two handles are brought close together respectively integral with the two arms, the free end of one of the arms used as a stop for the other end of the sheath tout while still allowing the cable which passes through it and which is connected to the free end of the other arm to slide freely.

The major disadvantage with this type of tool for elastic collars resides in the fact that the assembly and the maintenance of the sheath-cable unit are delicate and complicated. Indeed, with this type of tool, the cable which passes through one of the arms then is fixed to the free end of the other arm, does not make possible a rapid and reliable replacement of the cable and/or of the sheath when they are damaged. In addition, this configuration also does not make it possible to market prefabricated sheath-cable units that are easily interchangeable, as with this type of tool it is necessary to intervene on the cable in order to set up the sheath-cable unit on said tools.

SUMMARY

As such, the purpose of this invention is to propose an alternative to the systems for remotely handling a tool of prior art which is easier and therefore less expensive to manufacture and which allows for a prefabrication of the sheath-cable unit providing installation and maintenance for said unit that is easier.

To this effect, this invention has for object a remote manipulator of a tool comprising a body provided with a fixed jaw and a slide provided with a mobile jaw able to be displaced linearly in relation to the body, said remote manipulator comprising means of actuating located at a distance and coupled to said tools by the intermediary of a cable integral with a side of a means for fastening the slide and sliding inside a flexible sheath of which one end is integral with a means for fastening the body in such a way as to allow the cable to slide, with the means of actuating comprising two arms each associated respectively to a handle and able to be separated angularly from each other by rotation about an axis by a value such that the distance between the free end thereof is at least equal to the maximum linear displacement of the slide bearing the mobile jaw, when said two handles are brought close to one another. Said remote manipulator is remarkable in that each of the arms is such that the free end thereof allows for the clipping indifferently of the other end of the cable or of the other end of the sheath, with the sheath clipped in such a way as to allow the cable to slide.

According to a preferred embodiment, each of the arms receives at the free end thereof interchangeably respectively a sleeve allowing for the clipping indifferently of the other end of the cable or of the other end of the sheath, with the sheath clipped in such a way as to allow the cable to slide.

Each sleeve comprises two elastically deformable branches, substantially parallel to each other and determining between them a first slot comprising on the side of the free end of said two branches a wider section, and a second transverse slot substantially perpendicular to said first slot, opening advantageously on either side of the sleeve, with the first slots being such that the median longitudinal plane thereof is substantially perpendicular to the axis of rotation of said arms.

Preferably, the means for fastening of the body is similar to the sleeves and comprises two branches substantially parallel to each other determining between them a first slot comprising on the side of the free end of said two branches a wider section, and a second transverse slot substantially perpendicular respectively to the first slot, opening advantageously on either side of the means for fastening.

Likewise, the means for fastening of the slide is more preferably similar to the means for fastening of the body and comprises two branches substantially parallel to each other determining between them a first slot comprising on the side of the free end of said two branches a wider section, and a second transverse slot substantially perpendicular respectively to the first slot, opening advantageously on either side of the means for fastening.

According to a preferred embodiment, the second slot and sections of the respective means for fastening of the bodies and slide of the tool are more preferably identical.

According to a more advantageous embodiment, the second slot and section of the respective means for fastening of the bodies and slide of the tool are identical to the second slot and respective sections of the sleeves.

Advantageously, the cable is provided at each of the ends thereof with a tip comprising a body of cylindrical shape and a flange arranged around said body and extending perpendicularly to the longitudinal axis of the body.

Likewise, the sheath is more preferably provided at each of the ends thereof with a tip, comprising a tubular body of cylindrical shape and a flange arranged around said body and extending perpendicularly to the longitudinal axis of the body.

Each sleeve is snap-fitted on the associated arm and comprises at least one elastically deformable tab able to cooperate with a lug of the associated arm.

According to a preferred embodiment, the metal elements comprising the remote manipulator are cut from the metal strip, then folded or stamped.

BRIEF DESCRIPTION OF THE DRAWINGS

Other advantages and characteristics shall be made clearer in the following description of an alternative embodiment of a remote manipulator of tools according to the invention in reference to the annexed figures wherein.

DETAILED DESCRIPTION

Figure 1:
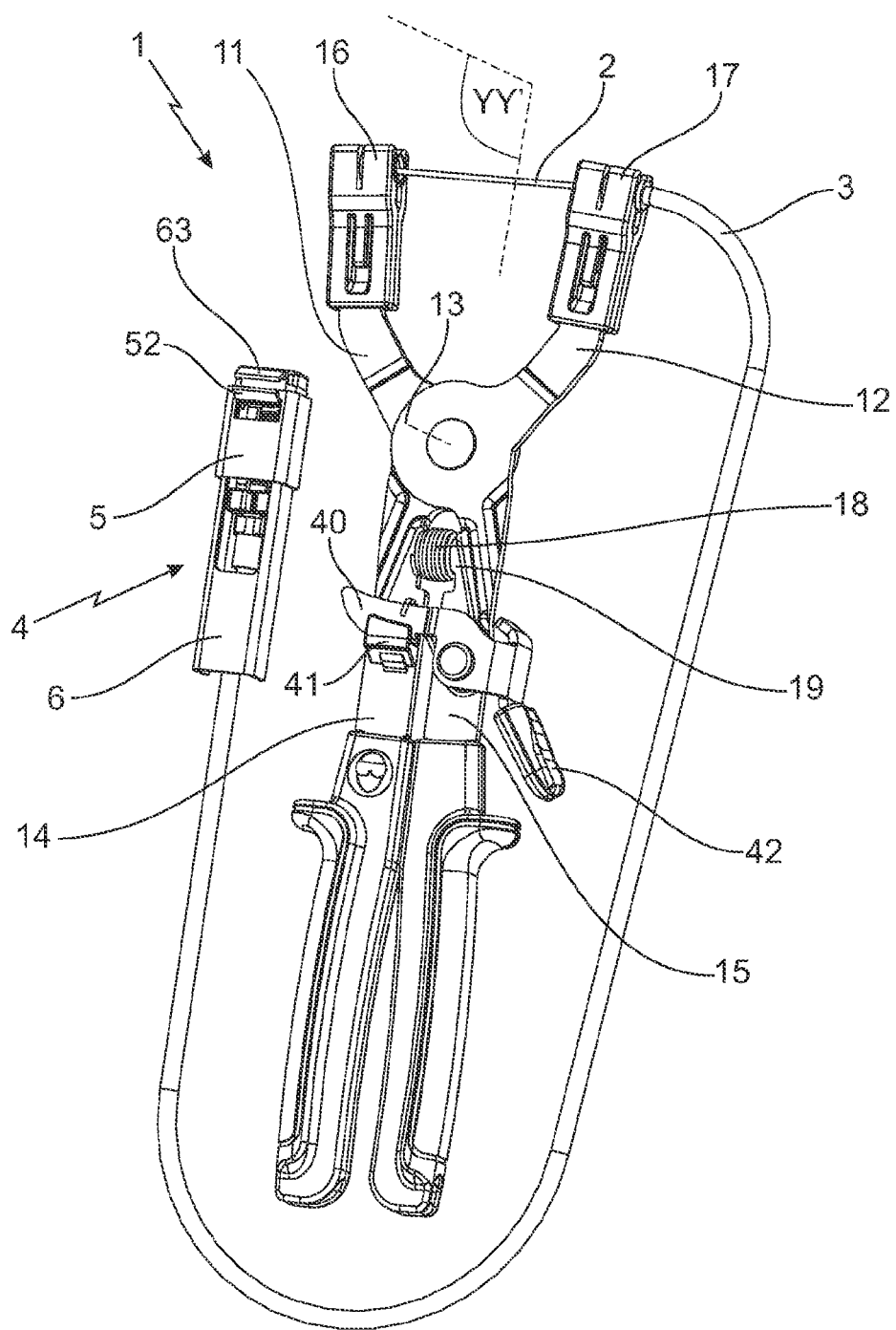
FIG. 1 is a perspective view of a remote manipulator of a tool according to the invention.
Figure 2:
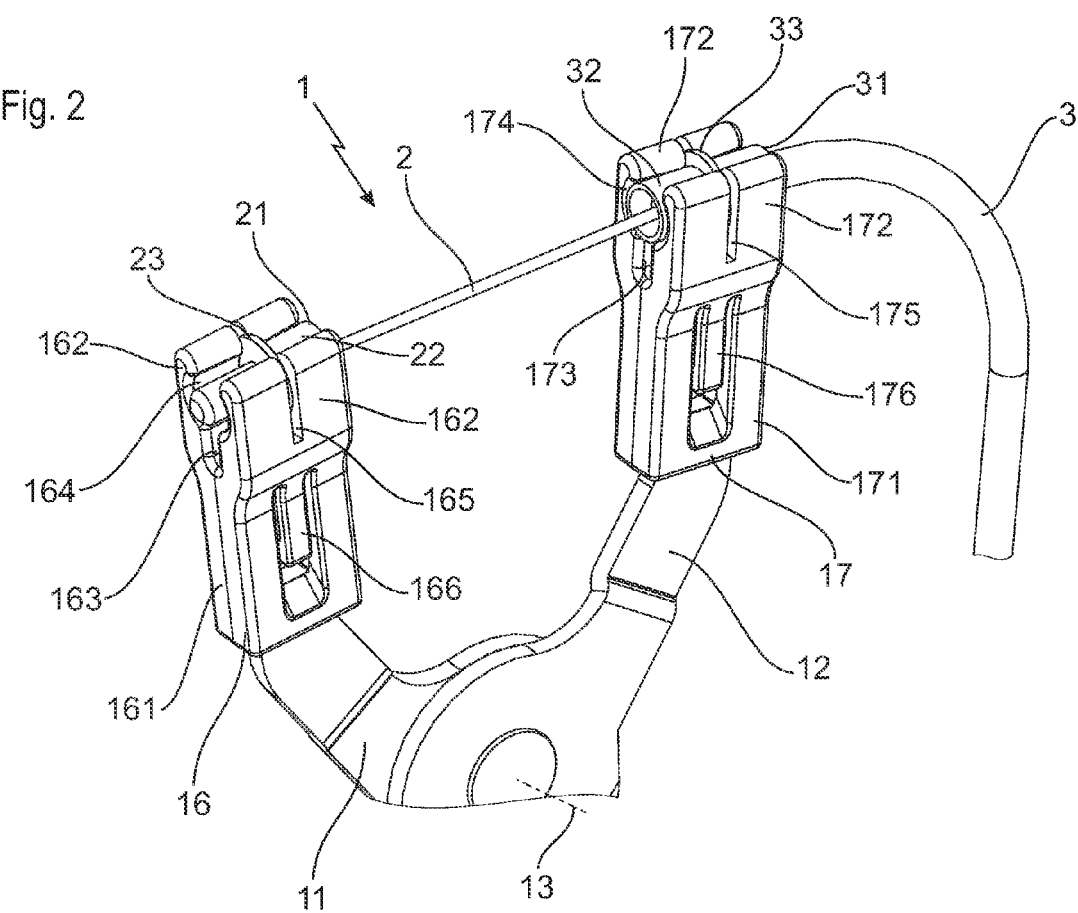
FIG. 2 is a partial detailed view in perspective of the end of the arms of the remote manipulator in FIG. 1.
Figure 3:
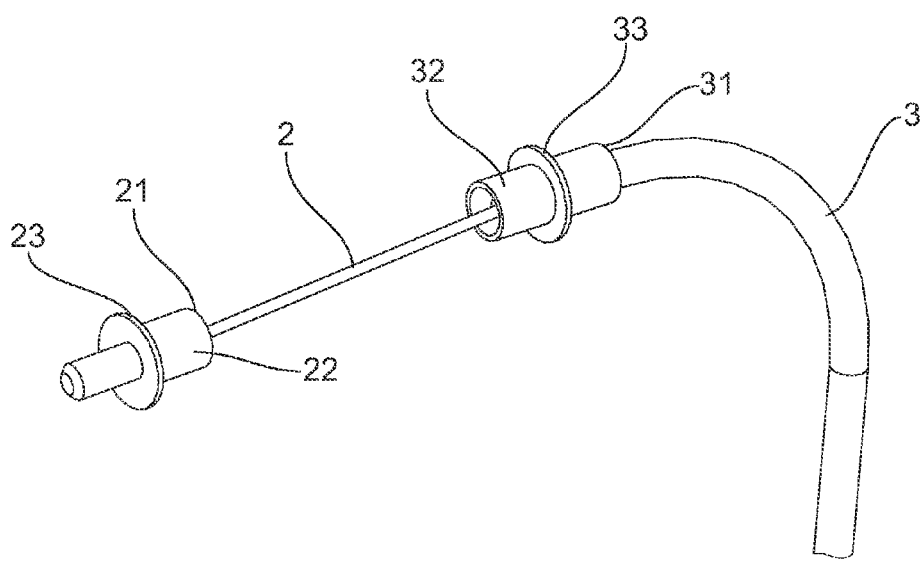
FIG. 3 is a partial detailed view in perspective of one of the ends of a cable-sheath unit of the remote manipulator in FIG. 1.

In reference to FIGS. 1 to 3, the remote manipulator 1 according to the invention comprises means of actuating connected by a unit comprising a cable 2 inside a sheath 3, to a tool 4 making it possible to act on the drive lugs of an elastic collar (not shown in the figures) with a view to the assembly or disassembly thereof for example on a hose pipe.

The cable 2 is provided at each of the ends thereof with a tip 21 advantageously crimped comprising a body 22 of cylindrical shape and a flange 23 arranged around said body 22 and extending perpendicularly to the longitudinal axis of the body 22 and substantially in the vicinity of the median transverse plane thereof.

The sheath 3 is also provided at each of the ends thereof with a tip 31 advantageously crimped, similar to the tips 21 of the cable 2, comprising a body 32 of cylindrical shape and a flange 33 arranged around said body 32 and extending perpendicularly to the longitudinal axis of the body 32 and substantially in the vicinity of the median transverse plane thereof. The body 32 is tubular in order to allow for the passage and the sliding of the cable 2 inside the sheath 3.

The body 22, 32 of the respective tips 21, 31 of the cable 2 and of the sheath 3 are advantageously of a cylindrical shape of revolution and of the same diameter.

Likewise, the flanges 23, 33 of the respective tips 21, 31 of the cable 2 and of the sheath 3 are more preferably of the same dimensions.

Figure 4:
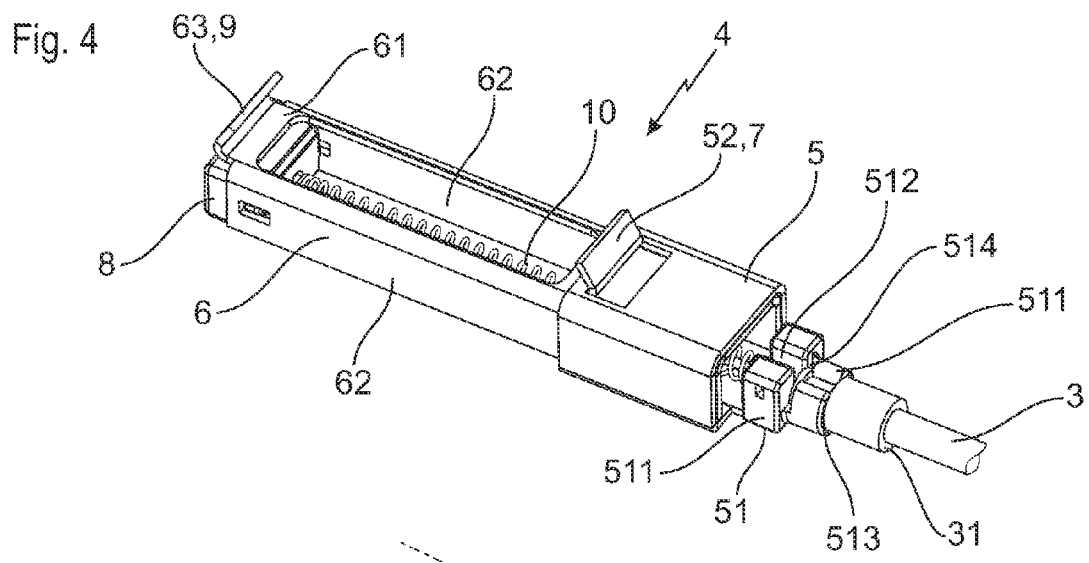
FIG. 4 is a partial detailed view in perspective of the tools of the remote manipulator in FIG. 1, in open jaw position.

In accordance with FIG. 4, the tools 4 for clamping and unclamping of the collar include primarily a body 5 of a globally tubular shape and a slide 6 with cross-section with the general shape of a U comprising a core 61 and two wings 62 extending perpendicularly from the longitudinal edges of said core 61, said slide 6 being able to slide inside said body 5 along the longitudinal axis of the latter.

The body 5 comprises a quick means for fastening 51 able, on the one hand, to receive reversibly, for example by clipping, one of the ends of the sheath 3 and, on the other hand, to allow to pass the cable 2 so that the end of the latter can be made integral reversibly, with the free end of the slide 6. The body 5 further comprises a tab 52 coming from the longitudinal surface of the body 5 located on the side of the core 61 of the slide 6 and extending towards the exterior of said body 5, said tab 52 being obtained advantageously by cutting then folding and acting with the body 5 as a fixed jaw 7.

The slide 6 comprises a block 8 arranged between said core 61 and wings 62 and fixed to the free end of said slide 6. The block 8 comprises a quick means for fastening (not shown in the figures), similar to the quick means for fastening 51 of the body 5, able to receive, reversibly, one of the ends of the cable 2. The core 61 of the slide 6 comprises a tab 63 similar to the tab 52 of the body 5, coming from the lateral edge of the core 61 arranged to the right of the block 8 and extending in the opposite direction of the wings 62, said tab 63 being obtained advantageously by folding and acting as a mobile jaw 9.

The respective tabs 52, 63 of the body 5 and of the slide 6 are inclined towards each other in relation to a plane perpendicular to the core 61 of the slide 6, in such a way as to form with said core 61 a housing with the global shape of a dovetail. As such, the drive lugs of an elastic collar can be pressing against the surfaces facing the respective tabs 52, 63 of the body 5 and of the slide 6 without risking at the moment of the clamping an untimely dislocation of said collar.

The tools 4 further comprise an extension spring 10 arranged inside the body 5, connecting the block 8 of the slide 6 and the body 5 and tending to clamp said block 8 and body 5 in order to facilitate the unclamping of the collar when the mobile jaw 9 comes close to the fixed jaw 7.

In reference to FIGS. 1 and 2, the means of actuating of the remote manipulator 1 are primarily comprised of two arms 11, 12 able to be separated from each other by rotation about an axis 13. Each arm 11, 12 is associated with a handle, respectively 14, 15, according to a particular arrangement causing each arm to correspond to the handle located on the same side of the plane YY' containing the median line of the handles 14, 15 and the axis 13 of rotation of the two arms 11, 12. As such, with such a configuration and in accordance with FIG. 1, it results that when the two handles 14, 15 are brought close together by rotation around the axis 13 the arms 11, 12 are separated, and inversely, when the two handles 14, 15 are separated from each other, the two arms 11, 12 tend to come closer together. Furthermore, the remote manipulator 1 globally has the shape of an X and is substantially symmetrical in relation to said plane YY'.

Accessorily, two ergonomic handles are attached straddling the two ends of the supports for handles 14, 15 in order to procure a better grasping of the tool.

The free end of each of the two arms 11, 12 comprises a sleeve, respectively 16, 17, integral interchangeably via any suitable means such as, for example, snap-fitting, forced assembly or bolting. Each sleeve 16, 17 has a transverse section with the general shape of a Y and includes a tubular core 161, 171 able to fit onto the free end of the associated arm 11, 12, and two elastically deformable branches 162, 172, substantially parallel to each other and coming from one of the ends of said core 161, 171. The two branches 162, 172 determine between them a first slot, respectively 163, 173, comprising on the side of the free end of said two branches 162, 172 a section, respectively 164, 174, that is wider able to cooperate with the bodies 22, 32 of the respective tips 21, 31 of the cable 2 and of the sheath 3 in order to maintain said body 22, 32 clamped between said two branches 162, 172. The first slots 163, 173 are such that the median longitudinal plane thereof is substantially perpendicular to the axis 13 of rotation of the arms 11, 12.

Those skilled in the art will have no difficulty in choosing the material used to carry out the sleeves 16, 17 and in determining the dimensions and the suitable mechanical characteristics so that the two branches 162, 172 are sufficiently elastic and resistant, on the one hand, to allow for the separation thereof in order to allow the bodies 22, 32 to pass to sections 164, 174 and, on the other hand, to provide the maintaining of said bodies 22, 32 between said two branches 162, 172.

In order to prevent the sliding between the two branches 162, 172 of the bodies 22, 32 along the longitudinal axis thereof, the two branches 162, 172 comprise a second transverse slot, respectively 165, 175, substantially perpendicular respectively to the first slot 163, 173, opening advantageously on either side of the respective sleeve 16, 17 and able to cooperate with one of the flanges 23, 33 of the respective tips 21, 31 of the cable 2 and of the sheath 3.

As such, it is easily understood that with such a configuration, it is very easy to install and to withdraw the respective tips 21, 31 of the cable 2 and of the sheath 3 of the arms 11, 12 of the remote manipulator 1 according to the invention facilitating maintenance when, for example the cable is damaged.

Moreover, the tip 21 of the cable 2 is clipped in the sleeve 16 of the arm 11 and the tip 31 of the sheath 3 is clipped in the sleeve 17 of the arm 12, or inversely.

In addition, the other tip 21 of the cable 2 is clipped in the means for fastening of the slide 6 of the tool 4 and the other tip 31 of the sheath 3 is clipped in the means for fastening 51 of the body 5 of the tool 4.

The means for fastening 51 of the body 5 of the tool 4 is similar to the sleeves 16, 17 associated to the arms 11, 12. As such, said means for fastening 51 of the body 5 comprises two branches 511 substantially parallel to each other determining between them a first slot 512 comprising on the side of the free end of said two branches 511 a section 513 that is wider able to cooperate with the body 32 of the associated tip 31 of the sheath 3 in order to maintain said body 32 tightened between said two branches 511. In addition, in order to prevent the sliding between the two branches 511 of the body 32 along the longitudinal axis thereof, the two branches 511 comprise a second transverse slot 514 substantially perpendicular respectively to the first slot 512, opening advantageously on either side of the means for fastening 51 and able to cooperate with the flange 33 of the associated tip 31 of the sheath 3.

The means for fastening (not shown in the figures) of the slide 6 of the tools 4 is similar to the previously described means for fastening 51 of the body and comprises two branches substantially parallel to each other determining between them a first slot comprising on the side of the free end of said two branches a wider section able to cooperate with the body 22 of the associated tip 21 of the cable 2 in order maintain said body 22 clamped between said two branches. In addition, in order to prevent the sliding between the two branches of the body 22 along the longitudinal axis thereof, the two branches comprise a second transverse slot substantially perpendicular respectively to the first slot, opening advantageously on either side of the means for fastening and able to cooperate with the flange 23 of the associated tip 21 of the cable 2.

The second slot 514 and sections 513 of the respective means for fastening 51 the bodies 5 and slide 6 of the tools 4 are more preferably identical and more advantageously identical to the second slot 165, 175 and respective sections 164, 174 of the sleeves 16, 17. Indeed, with this latter configuration, one of the tips 21 of the cable 2 can be indifferently clipped onto the slide 6 or onto one of the sleeves 16, 17. Likewise, one of the tips 1 of the sheath 3 can be indifferently clipped onto the body 5 or onto one of the sleeves 16, 17. It is easily understood that this preferred configuration facilitates maintenance since the cable 2 and sheath 3 can be mounted on the remote manipulator 1 without respecting a particular direction.

As such, the rotation of the two arms 11, 12 of the remote manipulator 1 around the axis 13 causes the separation or the tightening of the free ends of the sleeves 16, 17, but also the linear displacement of the mobile jaw 9 of the slide 6 in relation to the fixed jaw 7 of the body 5, which is naturally obtained by traction or pushed on the cable 2 sliding inside the sheath 3.

Those skilled in the art will have no difficulty in dimensioning the two arms 11, 12 of the remote manipulator 1 and the associated sleeve thereof 16, 17 in order to determine between the two ends thereof said sleeves 16, 17 a displacement equivalent to that of the mobile jaw 9 in the direction of and until contact with the fixed jaw 7.

It is easily understood that the remote manipulator 1 is particularly interesting because the cable 2-sheath 3 unit can be manufactured entirely in the factory and delivered on site with a view to the assembly thereof on said remote manipulator 1. Indeed, the cable 2 and sheath 3 can be first cut to length and provided with the tips 21, 31 thereof crimped in the factory, then dispatched to a user where said tips 21, 31 will be simply clipped onto the sleeves 16, 17 of the remote manipulator 1 and tool 4.

Furthermore, in the case of damage, the sleeves 16, 17 can also be easily interchanged. As such, according to a preferred embodiment, said sleeves 16, 17 are snap-fitted onto the arms 11, 12 and each comprise at least one elastically deformable tab 166, 176 able to cooperate with a lug (not shown in the figures) of the associated arm 11, 12 in order to maintain the sleeves 16, 17 in position on the arms 11, 12.

It is easily understood that the remote manipulator 1 according to the invention can have the interchangeable sleeves 16, 17 removed. In this case, the free end of each of the arms 11, 12 will be arranged in order to allow for the clipping indifferently of one of the ends of the cable 2 or of one of the ends of the sheath 3. For this, each end must include, for example, two branches determining a first slot provided with a wider section, and comprising a second slot. However, this configuration is particularly expensive as it requires machining of the arms 11, 12, and does not allow for easy maintenance if one of the branches is damaged.

According to accessory arrangements of the remote manipulator 1, it is provided to arrange between the two handles 14, 15 and in the vicinity of the articulation 13 thereof, a return spring 18 tending to separate at rest said handles 14, 15, i.e. to separate the mobile jaw 9 from the fixed jaw 7 at the end of the frame 7 of the tool 4.

The spring 18 is a simple helical spring blocked between two bosses 19 provided on the blade of the handles 14, 15.

In the same way, a ratchet mechanism is advantageously provided, mounted for example on the handle 15, in such a way that the end hook 40 thereof comes to cooperate with a lug 41 provided on the other handle 14 in order to maintain the two handles against each other when the latter are brought close together, i.e. when the mobile jaw 9 is brought in the vicinity of the fixed jaw 7; naturally, a manual device 42 makes it possible to disengage the end hook 40 from the lug 41 at any time, and as such release the two handles 14, 15 and through this, any traction on the drive lugs releasing the elastic collar.

According to a particularly advantageous construction of the remote manipulator 1, in reference in particular to FIGS. 1 and 4, the metal elements comprising the remote manipulator 1 are cut in the metal strip of thickness 5 mm for example, then folded or stamped. The technique of manufacturing without welding and without torsion makes it possible to significantly limit the costs of manufacture.

It is possible to carry out the remote manipulator 1 in accordance with the invention according to other configurations.

Figure 5:
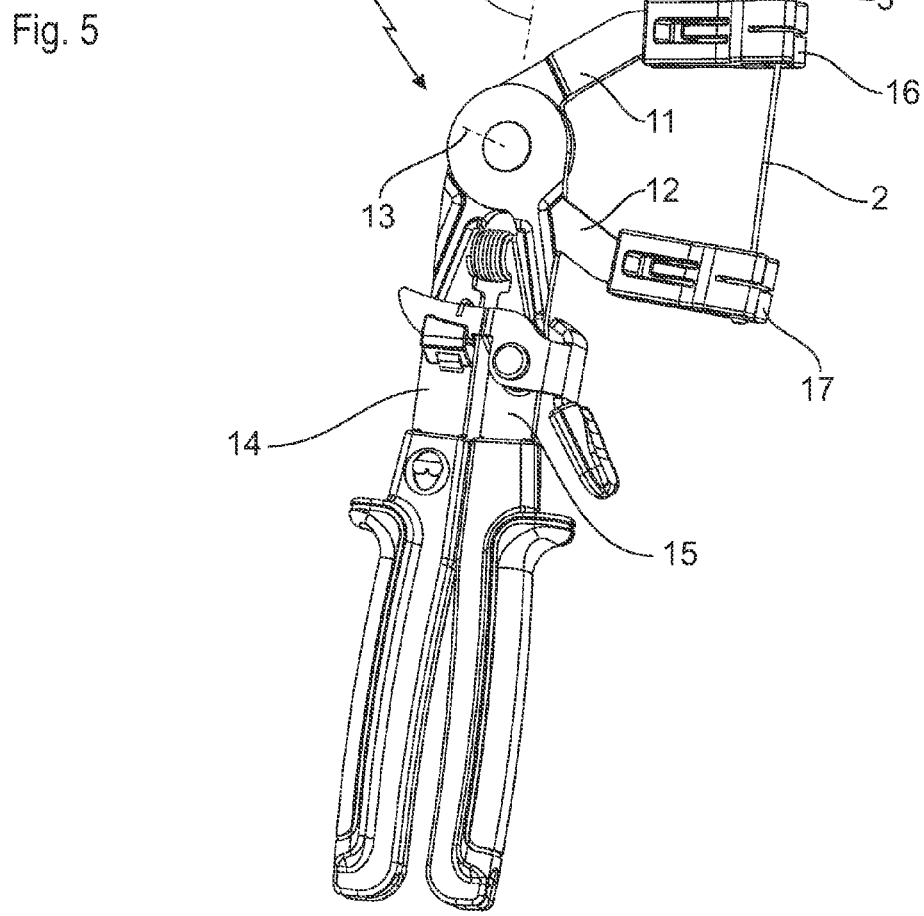
FIG. 5 is a perspective view of an alternative of a remote manipulator of a tool according to the invention.

As such, according to FIG. 5, the remote manipulator 1 no longer has the general shape of an X but is such that the two arms 11, 12 are inclined on the same side in relation to the previously described plane YY'; naturally the angle of inclination between said arms 11, 12 is still determined so that the separation or the tightening of the free ends of the sleeves 16, 17 associated with the arms 11, 12 correspond to the linear displacement of the mobile jaw 9 of the slide 6 in relation to the fixed jaw 7 of the body 5.

As described above, the remote manipulator 1 according to the invention coupled with the tool 4 thereof is particularly suited for the assembly and disassembly of elastic strip collars. However, it is always possible to use the remote manipulator 1 in all cases where it is required to linearly actuate two jaws between them and this, at a distance, by means of a flexible sheath; in this sense, the application that is particular to elastic collars constitutes an example that is without a doubt important but in no way restricts the scope of the invention.

Finally, it is clear that this invention is not limited to the sole embodiment of this remote manipulator 1; it encompasses, on the contrary, all of the alternative embodiments and applications that comply with the same principle.

What is claimed is:

1. A remote manipulator for a tool comprising a body provided with a fixed jaw and a slide provided with a mobile jaw able to be displaced linearly in relation to the body, said remote manipulator comprising means of actuating located at a distance and coupled to said tools by the intermediary of a cable integral with a side of a means for the fastening of the slide and sliding inside a flexible sheath of which one end is integral with a means for fastening of the body in such a way as to allow the cable to slide, with the means of actuating comprising two arms each associated respectively to a handle and able to be separated angularly from each other by rotation about an axis by a value such that the distance between the free ends thereof is at least equal to the maximum linear displacement of the slide bearing the mobile jaw, when said two handles are brought close to one another, wherein each of the arms receives at the free end interchangeably respectively a sleeve allowing for the clipping indifferently of the other end of the cable or of the other end of the sheath, with the sheath clipped in such a way as to allow the cable to slide.

2. The remote manipulator according to claim 1, wherein each sleeve comprises two elastically deformable branches, substantially parallel to each other and determining between them a first slot comprising on the side of the free end of said two branches a wider section, and a second transverse slot substantially perpendicular to said first slot, opening on either side of the sleeve, with the first slots being such that a median longitudinal plane thereof is substantially perpendicular to the axis of rotation of said arms.

3. The remote manipulator according to claim 2, wherein the means for fastening of the body is similar to the sleeves and comprises two branches substantially parallel to each other determining between them a first slot comprising on the side of the free end of said two branches a wider section, and a transverse second slot substantially perpendicular respectively to the first slot, opening on either side of the means for fastening.

4. The remote manipulator according to claim 3, wherein the means for fastening of the slide is similar to the means for fastening of the body and comprises two branches substantially parallel to each other determining between them a first slot comprising on the side of the free end of said two branches a wider section, and a second transverse slot substantially perpendicular respectively to the first slot, opening on either side of the means for fastening.

5. The remote manipulator according to claim 4, wherein the second slot and sections of the respective means for fastening of the bodies and slide of the tool are identical.

6. The remote manipulator according to claim 5, wherein the second slot and sections of the respective means for fastening of the bodies and slide of the tool are identical to the second slot and respective sections of the sleeves.

7. The remote manipulator according to claim 2, wherein the cable is provided at each of the ends thereof with a tip comprising a body of cylindrical shape and a flange arranged around said body and extending perpendicularly to a longitudinal axis of the body.

8. The remote manipulator according to claim 2, wherein the sheath is provided at each of the ends thereof with a tip comprising a tubular body of cylindrical shape and with a flange arranged around said body and extending perpendicularly to a longitudinal axis of the body.

9. The remote manipulator according to claim 1, wherein each sleeve is snap-fitted on the associated arm and comprises at least one elastically deformable tab able to cooperate with a lug of the associated arm.

10. The remote manipulator according to claim 1, further comprising a ratchet mechanism mounted on one of the handles.

11. The remote manipulator according to claim 10, wherein the ratchet mechanism, the arms and the handles are cut in a metal strip, then folded or stamped.

* * * * *